(12) United States Patent
De Spiegeleer et al.

(10) Patent No.: US 9,699,255 B2
(45) Date of Patent: *Jul. 4, 2017

(54) DEVICE DRIVER

(71) Applicant: AMPLIDATA NV, Lochristi (BE)

(72) Inventors: Kristof Mark Guy De Spiegeleer, Knokke-Heist (BE); Wim Michel Marcel De Wispelaere, Ghent (BE)

(73) Assignee: Amplidata NV, Lochristi (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,660

(22) Filed: Jan. 4, 2016

(65) Prior Publication Data

US 2016/0119428 A1 Apr. 28, 2016

Related U.S. Application Data

(63) Continuation of application No. 13/635,444, filed as application No. PCT/EP2011/000128 on Jan. 11, 2011, now Pat. No. 9,256,383.

(60) Provisional application No. 61/314,240, filed on Mar. 16, 2010.

(51) Int. Cl.
| | |
|---|---|
| *G06F 12/00* | (2006.01) |
| *H04L 29/08* | (2006.01) |
| *G06F 3/06* | (2006.01) |
| *G06F 11/14* | (2006.01) |
| *G06F 11/16* | (2006.01) |
| *G06F 11/20* | (2006.01) |
| *G06F 12/0866* | (2016.01) |

(52) U.S. Cl.
CPC ........ *H04L 67/1097* (2013.01); *G06F 3/0604* (2013.01); *G06F 3/067* (2013.01); *G06F 3/0608* (2013.01); *G06F 3/0656* (2013.01); *G06F 3/0661* (2013.01); *G06F 3/0689* (2013.01); *G06F 11/1471* (2013.01); *G06F 11/1666* (2013.01); *H04L 67/16* (2013.01); *H04L 67/32* (2013.01); *G06F 11/20* (2013.01); *G06F 12/0866* (2013.01); *G06F 2201/84* (2013.01); *G06F 2212/465* (2013.01); *G06F 2212/466* (2013.01)

(58) Field of Classification Search
CPC ..... H04L 67/1097; H04L 67/16; H04L 67/32; G06F 3/0604; G06F 3/0608; G06F 3/0656; G06F 3/0661; G06F 3/067; G06F 3/0689; G06F 11/1471; G06F 11/1666; G06F 11/20; G06F 12/0866; G06F 2212/465; G06F 2212/466; G06F 2201/84
See application file for complete search history.

(56) References Cited

U.S. PATENT DOCUMENTS 6,311,193 B1 * 10/2001 Sekido .............. G06F 17/30088

* cited by examiner

*Primary Examiner* — Kalpit Parikh

(74) *Attorney, Agent, or Firm* — Patent Law Works LLP

(57) ABSTRACT

A device driver includes an aggregator aggregating data blocks into one or more container objects suited for storage in an object store; and a logger for maintaining in at least one log file for each data block an identification of a container object wherein the data block is stored with an identification of the location of the data block in the container object.

20 Claims, 8 Drawing Sheets

DEVICE DRIVER

CROSS REFERENCE TO RELATED APPLICATIONS

This application is a continuation of and claims priority to U.S. application Ser. No. 13/635,444, filed Oct. 15, 2012, titled "Device Driver for Use in a Data Storage System," which is the National Stage of International Application No. PCT/EP11/00128 filed Jan. 11, 2011, titled "Device Driver for Use in a Data Storage System," which claims benefit to U.S. Provisional Application No. 61/314,240, filed Mar. 16, 2010, titled "Device Driver for Use in a Data Storage System," each of which is incorporated by reference herein in its entirety.

FIELD OF THE INVENTION

Cloud storage services are becoming well adopted by the market. Typically, the cloud storage services are targeted at storing large amounts of objects or files redundantly in a distributed storage infrastructure. Cloud storage is used to offer public storage services over the internet or local enterprise storage over the local area network (LAN). Enterprise storage systems typically use block devices that are accessed over storage area network (SAN) interfaces such as FibreChannel (FC) or iSCSI. The current invention offers a solution to make cloud storage accessible through a standard block device interface, such that the cloud storage system can be used as an enterprise storage system.

BACKGROUND OF THE INVENTION

In computing, specifically data transmission and data storage, a block is a sequence of bytes or bits, having a nominal length which is also referred to as a block size. The process of putting data into blocks is used to facilitate the handling of the data-stream by the computer program receiving the data. Blocked data are normally read a whole block at a time. This means that there is no means to address the data put inside a block.

Blocks in a block device are typically only 512 bytes large. An operating system that uses this block device would typically write or read 8 blocks at a time. Such a group of 8 blocks is typically referred to as a cluster. As such a cluster is a sequence of blocks that is written and read consecutively.

Block special files or block devices correspond to devices through which the operating system moves data in the form of blocks. Device nodes corresponding to these devices often represent addressable devices such as hard disks, CD-ROM drives, or memory-regions.

Logical Block Addressing (LBA) is a particularly simple linear addressing scheme. Blocks are located by an index, with the first block being LBA=0, the second LBA=1, and so on. The LBA scheme replaces earlier schemes which exposed the physical details of the storage device to the software of the operating system. Chief among these was the cylinder-head-sector (CHS) scheme, where blocks were addressed by means of a tuple which defined the cylinder, head, and sector at which they appeared on the hard disk. Current LBA schemes allow disks of size 128 PetaByte to be addressed, assuming a block size of 512 bytes.

A storage snapshot is a set of reference markers, or pointers, to data stored on a disk drive, on a tape, or in a storage area network (SAN). A snapshot is something like a detailed table of contents, but it is treated by the computer as a complete data backup. Snapshots streamline access to stored data and can speed up the process of data recovery. In current storage technologies, there are two main types of storage snapshot, called the copy-on-write (or low-capacity) snapshot and the split-mirror snapshot. Utilities are available that can automatically generate either type.

A copy-on-write snapshot utility creates a copy of the existing data blocks at another location to store new data blocks in a given location every time existing data blocks are updated. This allows rapid recovery of data in case of a disk write error, corrupted file, or program malfunction. However, all previous snapshots must be available when complete archiving or recovery of all the data on a network or storage medium is needed. The copy operation for every block of data that is updated slows down the write process significantly.

A split-mirror snapshot utility references all the data on a set of mirrored drives. Every time the utility is run, a snapshot is created of the entire volume, not only of the new or updated data. This makes it possible to access data offline, and simplifies the process of recovering, duplicating, or archiving all the data on a drive. However, this is a slower process, and it requires more storage space for each snapshot.

Cloning is the process of providing a copy of a point in time of data storage and allowing write operations on it without modifying the original data storage where this copy has been taken from.

MetaData in a block device and storage context is data that describes data operations: when specific block operations have been executed on what data, in what sequence and where these blocks or block changes are stored and how these can be addressed.

Cloud storage solutions are typically best suited to store large objects, with a size of 1 MB and more (e.g. mp3 files, mpeg files, jpg files, etc.).

In order to make cloud storage available to systems, such as operating systems, file systems, applications, hypervisors, . . . which were developed mainly to interface with block devices there is a need for a device driver that can manage the transfer between a block or clusters and cloud storage container objects in an efficient way.

As such it is an object of the current invention to provide intelligent caching technology such that a sequence of block or cluster writes is grouped and stored in a cloud storage container object with a size that is well suited for a cloud storage system (e.g. 4 MB).

SUMMARY OF THE INVENTION

According to a first aspect of the invention there is provided a device driver comprising a block device interface able to handle data in the form of small, fixed length data blocks and an object reader/writer able to transfer data in the form of larger data objects from and/or to a storage system, said device driver comprising:

aggregation means for aggregating said data blocks into one or more container objects suited for storage in said object store; and log means for maintaining in at least one log file for each data block an identification of a container object wherein said data block is stored and an identification of the location of said data block in said container object.

As such, the device driver according to the invention allows the application and optionally the file system to interact with the cloud storage system using the same facilities as it has available for known physical block devices.

According to an embodiment of the invention said aggregation means comprise:
   means for generating at least one container object;
   means for appending successive clusters of said data blocks to said container object;
   means for closing said container object; and
   means for writing said container object in said object store.

In this way the device driver according to this embodiment of the invention can be implemented with a few simple and efficient components.

According to a further embodiment of the invention said means for closing said container object are adapted to close said container object whenever:
   the size of said container object exceeds a predetermined maximum size;
   a predetermined time period is exceeded;
   a snapshot command is received; or
   a sync command is received.

According to still a further embodiment of the invention said log means comprise:
   means for generating at least one transaction log file;
   means for updating said transaction log file each time a data block is appended to a container object;
   means for closing said transaction log file; and
   means for writing said transaction log file in said object storage system.

According to still a further embodiment of the invention said means for closing said transaction log file are adapted to close said transaction log file whenever:
   the size of said transaction log file exceeds a predetermined maximum size;
   a predetermined time period is exceeded;
   a snapshot command is received; or
   a sync command is received.

This allows for a simple, robust and efficient implementation of the components of the device driver.

According to a preferred embodiment the device driver according to the invention, further comprises one or more of the following:
   a container object cache for caching container objects;
   a log file cache for caching transaction log files; and
   means for maintaining a meta data cache.

According to still a further embodiment of the invention said means for maintaining a metadata cache comprise:
   means for generating a meta data cache;
   means for updating said meta data cache each time a data block is appended to a container object.

According to a preferred embodiment of the invention said container object cache comprises plural tiers of cache memories, a first tier with low capacity and fast access speed, and one or more successive tiers having higher capacity and lower access speeds.

According to a further embodiment of the invention the device driver comprises a plurality of block devices interfaces, said device driver comprising:
   a single container object cache, eventually comprising plural tiers of cache memories, for handling data blocks received from said plural block device interfaces;
   plural log file caches, i.e. one log file cache per block device interface;
   plural metadata caches, i.e. one metadata cache per block device interface.

According to a preferred embodiment of the invention the device driver further comprises means for generating a snapshot comprising:
   means for closing a container object;
   means for writing said container object in said object storage system;
   means for closing a transaction log file;
   means for writing said transaction log file in said object store;
   means for writing a meta data file in said object store referencing said transaction log file in relation to said snapshot.

This allows a snapshot to be generated without the overhead of additional data copy operations and without affecting the performance of the block device interface.

According to a preferred embodiment of the invention said device driver further comprises means for generating a clone comprising:
   means for generating a clone block device interface;
   means for generating a transaction log file for said clone block device;
   means for reading from said object storage system transaction log files from creation of said block device interface up to a given snapshot; and
   means for replaying said transaction log files to thereby generate a meta data cache for said clone block device interface.

This allows a clone to be generated without the overhead of additional data copy operations and without affecting the performance of the block device interface.

According to a preferred embodiment of the invention said device driver further comprises means for scrubbing to remove obsolete data stored in between two successive snapshot events from said object storage system.

According to a preferred embodiment of the invention the device driver further comprises means for failover caching a data block before appending said data block to said container object and before updating said transaction log file.

This allows for a robust device driver that is able to recover without errors even when severe failures occur.

According to a second aspect of the invention there is provided an application programming interface (API) with functionality of the device driver according to the first aspect of the invention.

According to a third aspect of the invention there is provided a software application module with functionality of the device driver according to the first aspect of the invention.

According to a fourth aspect of the invention there is provided a method for providing a block device interface able to handle data in the form of small, fixed length data blocks and an object reader/writer for transferring data to an object storage system able to store data in the form of larger data objects, the method operating in accordance with the device driver, the application programming interface or software application module according to any of the previous aspects of the invention.

DETAILED DESCRIPTION OF EMBODIMENT(S)

Figure 1:
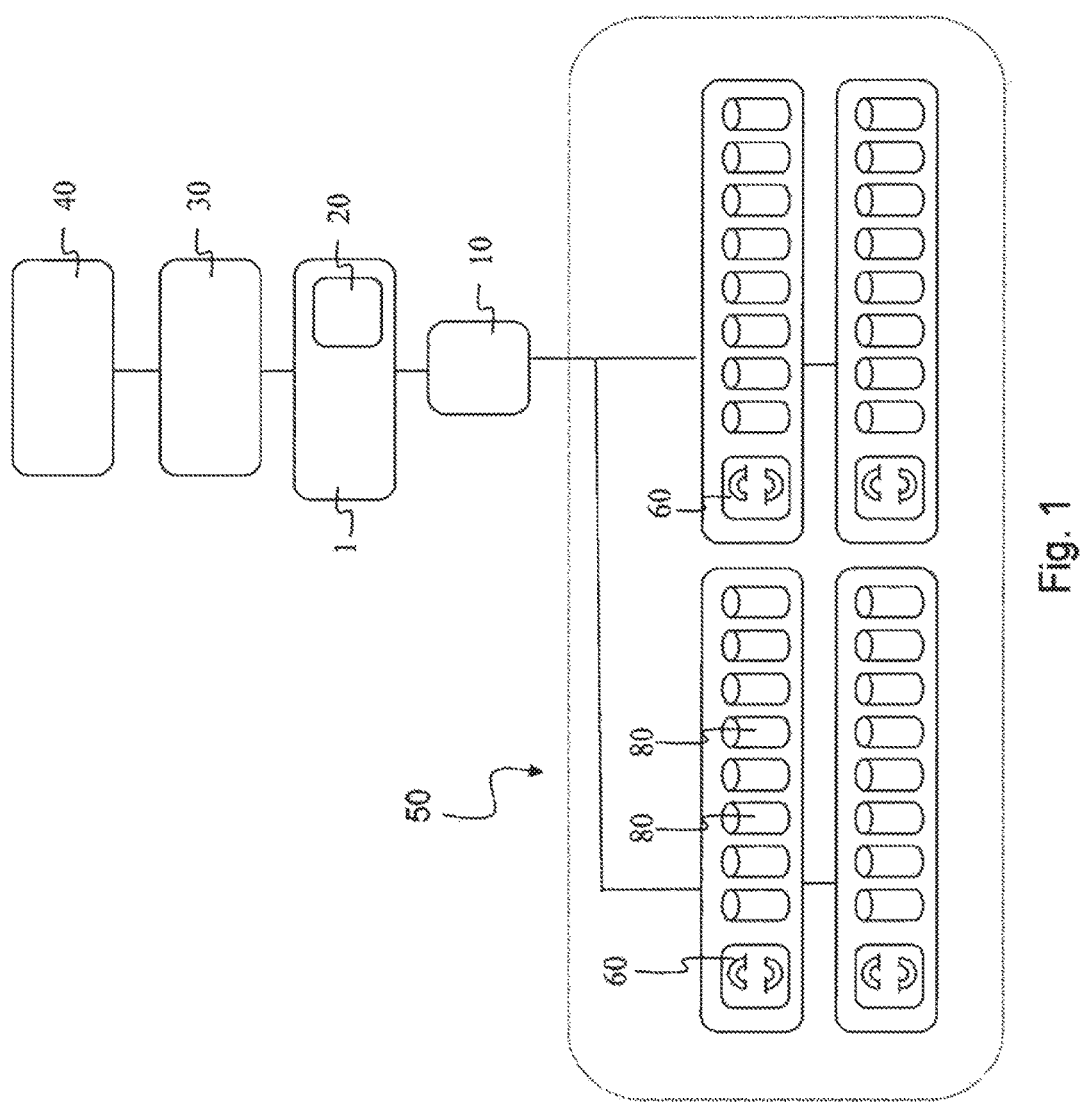
FIG. 1 illustrates a cloud storage system comprising a device driver according to the invention.

FIG. 1 gives an overview of a cloud storage system comprising a device driver according to the invention. It comprises an application 40 that interacts with a file system 30 in order to store or retrieve data for example in a file. Such an application could for example be a music streamer application that is retrieving is interacting with the file system 30 in order to retrieve data from a predetermined file such as for example a mp3 file. The file system 30, which could be any suitable known file system, is configured to interact with a block device using the LBA scheme. File system 30 is a software component usually associated with an operating system. Typically file system 30 provides means for creating, updating, maintaining, and hierarchically organizing digital data. The file system 30 accepts digital data of arbitrary size, segments the digital data into fixed-size blocks, and maintains a record of precisely where on the block device data is stored and what file the data is associated with. In addition, the file system 30 provides a hierarchical directory structure to better organize numerous files.

Device driver 1 according to the invention provides a block device interface that allows for the block-based read and write operations, with for example a 512 byte block-size. Typically a sequence of 8 or a multitude of 8 blocks is accessed in sequence. Such a sequence is also called a cluster. Every cluster read or write operation is identified by an LBA (Logical Block Address) of the first block in the cluster.

Various interfaces to storage devices are also well known in the art. For example, Small Computer System Interface ("SCSI") is a well-known family of interfaces for connecting and transferring data between a file system 30 and a block device. There are also a number of standards for transferring data between a file system 30 and storage area networks ("SAN"). For example, Fibre Channel is a networking technology that is primarily used to implement SANs. Fibre Channel SANs can be accessed through SCSI interfaces via Fibre Channel Protocol ("FCP"), which effectively bridges Fibre Channel to higher level protocols within SCSI. Internet Small Computer System Interface ("iSCSI"), which allows the use of the SCSI protocol over IP networks, is an alternative to FCP, and has been used to implement lower cost SANs using Ethernet instead of Fibre Channel as the physical connection. Interfaces for both FCP and iSCSI are available for many different operating systems, and both protocols are widely used. The iSCSI standard is described in "Java iSCSI Initiator," by Volker Wildi, and Internet Engineering Task Force RFC 3720, both of which are hereby incorporated by reference In its basic form, the device driver 1 according to the current invention groups a sequence of cluster writes associated with a predetermined LBA and transferred from the file system 30 in a larger object called a storage container object (SCO) 120. The metadata that references which cluster was written in which SCO 120 is written in an object called a transaction log (TLOG) 130. As SCO's and TLOG's fill up they are being transferred to the object store interface 10. The device driver 1 also offers the functionality to the file system 30 to retrieve the stored data from the SCO's and TLOG's by means of a simple LBA based lookup.

Figure 2:
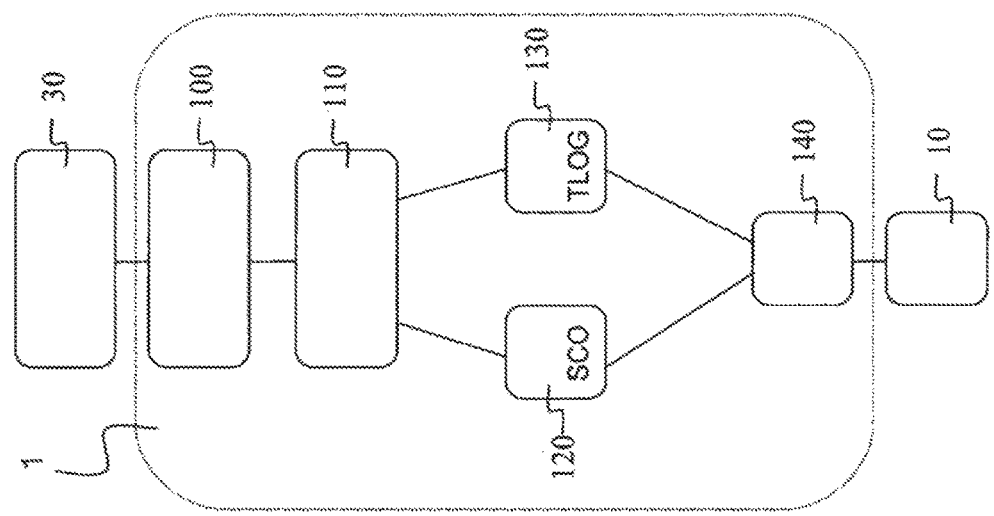
FIG. 2 shows in more detail a fragment of FIG. 1 comprising a device driver according to the invention according to a first embodiment.

FIG. 2 shows some specific components of the device driver 1 in more detail. When a cluster write operation is issued through the block device interface 100 for writing a cluster at a predetermined LBA x comprising data sized 4 Kbytes, following actions will happen:

1. The cluster is transferred from the block device interface 100 to a volume interface 110 that writes the cluster into a Storage Container Object (SCO) 120. The SCO is an object that is a coalescence of clusters that have been written to the block device interface 100 arranged in order of time of writing. The first cluster will create the SCO, the second cluster written will be appended to the SCO, etc. . . . . . Once the SCO exceeds a defined size, the SCO is closed and transferred to an object reader/writer 140. Optionally the SCO could also be closed after a predetermined time period, a snapshot or a sync command. This object reader/writer 140 will then transfer the SCO in a suitable way, in this embodiment through object store interface 10, to one or more object storage systems 50 which will finally store the SCO on a physical storage device 80 for subsequent retrieval. Such a object store interface 10 is for example known from WO2009/135630, but any other suitable object store interface will do. A new SCO object will be created as soon as a new write operation arrives after a previous SCO was closed. An SCO is identified by an SCO-name, which could comprise a Universally Unique IDentifier (UUID) or a Globally Unique IDentifier (GUID).

2. The transaction log (TLOG) 130 is then updated by the volume interface 110 with the LBA x, the SCO-name and the offset d within that SCO. The offset d is a number that identifies how many bytes from the beginning of the SCO the block or cluster associated with LBA x is written. Once a TLOG 130 exceeds a defined size, the TLOG is closed by the volume interface 110 and transferred to the object store interface 10 by the object reader/writer 140. Optionally the TLOG could also be closed after a predetermined time period, a snapshot or a sync command. Subsequently the TLOG is transferred to the object store 140 that writes it to the object storage systems 50. A new TLOG object will be created as soon as a new write operation arrives. A TLOG is identified by a TLOG-name, which could comprise a Universally Unique IDentifier (UUID) or a Globally Unique IDentifier (GUID).

When a block or cluster read operation is issued through the block device interface 100, for reading a cluster at a predetermined LBA y comprising data sized 4 Kbytes, following actions will happen:

1. TLOG's will be read from the object storage system 50 by the object reader/writer 140 through the object store interface 10 in reverse order, this means most recent first. Inside the read TLOG's, the logged operations are read in reverse order until the most recent TLOG entry associated with a block write operation on the requested LBA y is found. For that LBA y TLOG entry the associated SCO-name z of the SCO where the actual block data associated with LBA y is residing and what it's offset d is inside that SCO is retrieved 2. The object reader/writer 140 reads the SCO with SCO-name z from the object storage system 50.

3. The SCO with SCO-name z is opened and a read-operation will be executed by the object reader/writer 140 starting at offset d and will retrieve the 4 Kb cluster data and provide it to the volume interface 110, which will transfer it to the block device interface 110, which will then transfer it to the file system 30 for the application 40 which is interacting in this way with the block device interface 100.

This first embodiment provides a basic architecture that provides a solution to aggregate small block writes in larger SCO and TLOG objects. These objects are better suited for storage in the object storage system 50.

Whenever an SCO 120 is filled up and closed by the block device interface 100, the SCO is queued for writing to the object storage system 50 by the object reader/writer 140. The object reader/writer 140 will process the write jobs as they appear in this queue. Only one object reader/writer 140 is working for a given block device interface 100, also known as a volume, at any time. Multiple object writers 140 can process multiple volumes in parallel.

Whenever a TLOG 130 is filled up and/or closed by the block device interface 100, it is queued for writing to the object storage system 50 by the object reader/writer 140. The TLOG will be queued after all SCO's 120 that the TLOG is referring to. Like this, any TLOG in the object storage system 50 always refers to SCO's which are already present in the object storage system 50.

TLOGs 130 are written to the object storage system 50 at the following events:

The TLOG size grows beyond a given limit.

A snapshot on the volume is taken.

A sync to object storage system 50 command is given. This is triggered by an external application (e.g. a database that wishes to reset to a particular situation or state) or once every x seconds.

The object storage system 50 is considered to be always available and redundant, such that every SCO 120 and TLOG 130 written to that object storage system can always be retrieved.

One of the drawbacks of this basic architecture is that every object needs to be read back from the object store to perform a read operation. This is potentially too slow.

Figure 3:
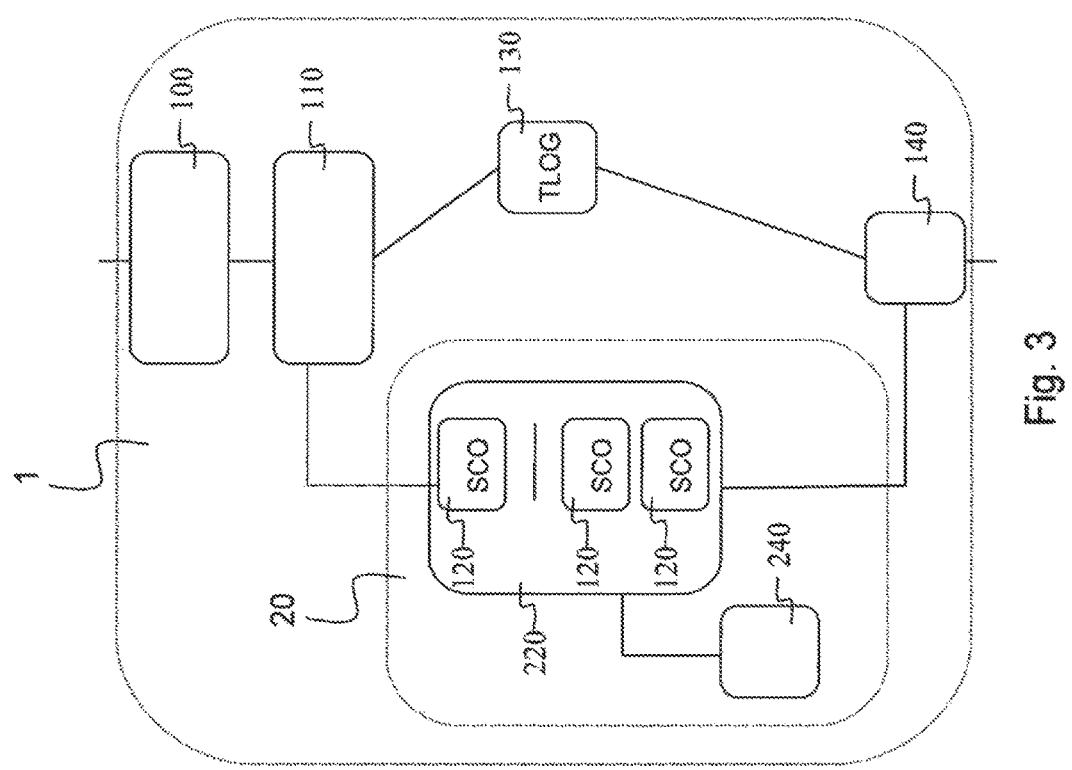
FIGS. 3 to 8 show respective further embodiments of the device driver according to the invention.

Therefor as shown in FIG. 1 and in more detail in the embodiment according to FIG. 3, a local object cache 20 is added. The local object cache 20 comprises a data cache 220 for locally storing multiple SCOs and a data cache manager 240 for deciding which SCO's need to be stored in the data cache 220. The data cache manager 240 uses a caching algorithm that attempts to predict which clusters will be read next. The SCO's that contain these clusters are retained in the data cache 220 such that read requests for these clusters can be fulfilled from the SCO's in the data cache 220 without having to read the SCO's back from the object storage system 50.

Several caching algorithms can be used to decide which SCO's are retained in the cache. Examples are, but the implementation is not limited to, most recently used (MLU) and most frequently used (MFU).

As the capacity of the data cache 220 is limited, SCO's will need to be removed from the data cache 220 to make room for other SCO's that are identified as better candidates to cache by the caching algorithm. Cleaning the cache is also done by a data cache manager 240.

The data cache manager 240 can be part of the volume interface 110, or optionally it can be implemented as a separate parallel process. The advantage of implementing it as a separate process is that the data cache manager 240 can manage the cache across multiple volumes that are running on the volume interface 110, spreading all the available cache space amongst all available volumes.

The data cache manager 240, if implemented as a separate process, uses the reverse process as explained above to decide which blocks can be removed. I.e if the data cache manager 240 implements a most recently used (MLU) algorithm to identify SCO's to be retained in the data cache 220, the data cache manager 240 will use a least recently used (LRU) algorithm to decide which SCO's to remove. Similarly, if the data cache manager 240 implements a most frequently used (MFU) algorithm to identify SCO's to be kept, the data cache manager 240 will use a least frequently used (LFU) algorithm to decide which SCOs to remove.

Figure 4:
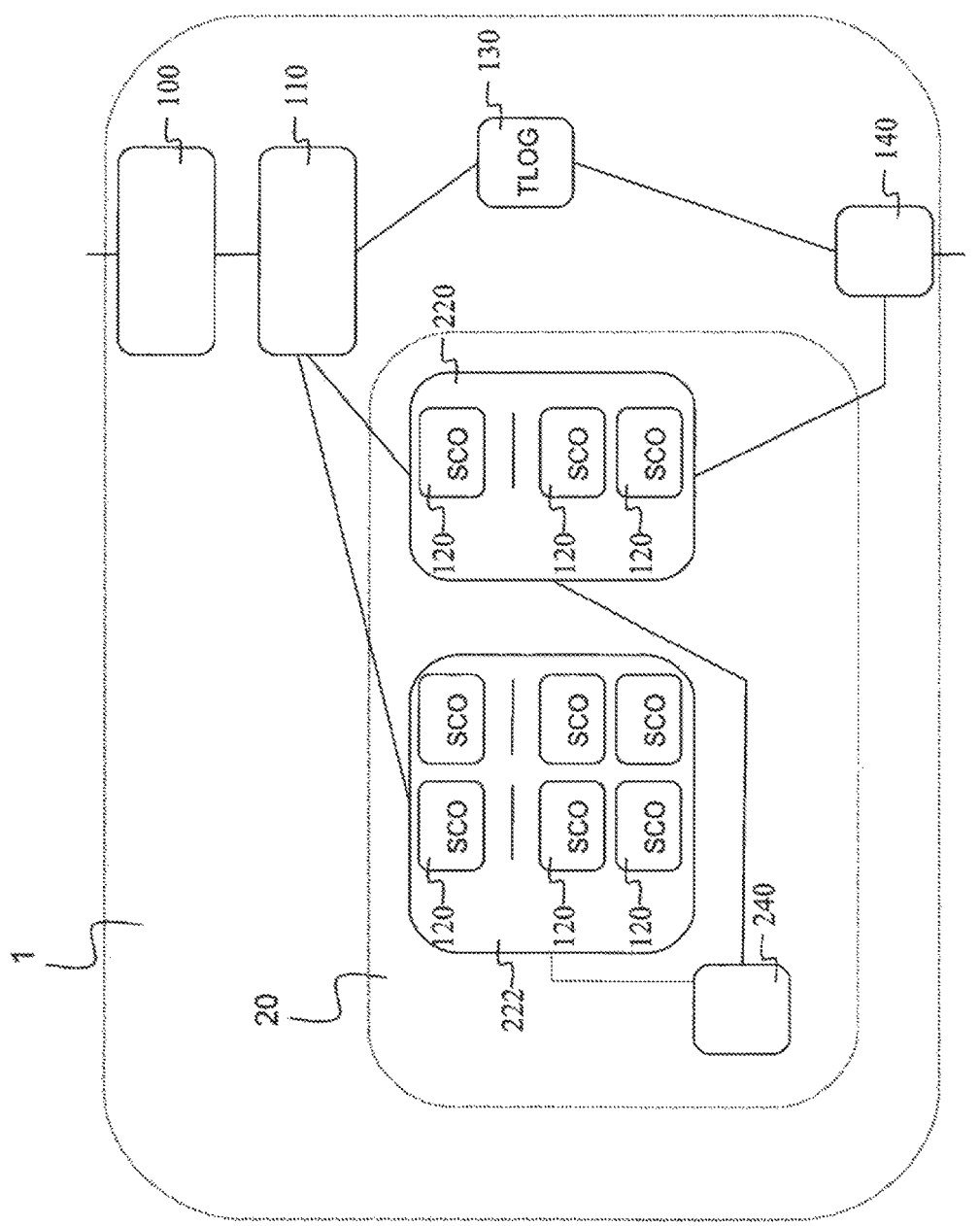

According to a further embodiment shown in FIG. 4 optionally there can be provided a multi-tier data cache 220, 222. The performance of the data cache 220, 222 determines the performance of the block device interface 100. Performance is measured as input output operations per second (IOPS) and as throughput in MB/s. Higher performance of the data cache 220, 222 will yield higher performance of the exposed block device interface 100.

Memory and solid state drives typically have higher IOPS specifications than mechanical disk drives. Mechanical disk drives then again have higher IOPS specifications than the object storage system 50. On the other hand, the higher IOPS devices typically have lower capacity.

Therefore, one might decide to optionally deploy multiple tiers for the data cache 220, 222:

Tier 1 data cache 220: a high IOPS low capacity device such as a solid state drive; and Tier 2 data cache 222: a medium IOPS high capacity device such as a SATA disk drive.

The data cache manager 240 will manage the placement and retention of the SCO's in the data cache 220, 222 based on the implemented caching algorithm. The candidates with highest cache ranking (MFU, MRU or other) are stored in the Tier 1 data cache 220. Also the newly created SCO's are stored in Tier 1 data cache 220 by the volume interface 110.

According to this embodiment of the invention SCO's with lower ranking are moved to the Tier 2 data cache 222 whenever the Tier 1 data cache 220 capacity fills over 80% of the available capacity. It is clear that alternative levels of available capacity could equally be determined, such as for example 90%. Only SCO's that were closed and written to the object storage system 50 can be moved from the Tier 1 data cache 220 to the Tier 2 data cache 222. According to still further embodiments any suitable amount of multiple Tiers of data cache can be provided. Then similarly, if the Tier 2 capacity fills over 80% of the available capacity, SCO's with lower ranking can be moved to lower tiers of data cache. If the lowest tier of the data cache fills up over 80% of the available capacity, SCO's can be removed by the data cache manager 240. This will not lead to data loss as the SCO's were written to the object storage system 50 when they were created in the Tier 1 data cache 220. If data from these removed SCO's is needed to serve read requests from the block device interface 100, they are first read from the object storage system 50 into the Tier 1 data cache 220 of the local object cache 20.

Figure 5:
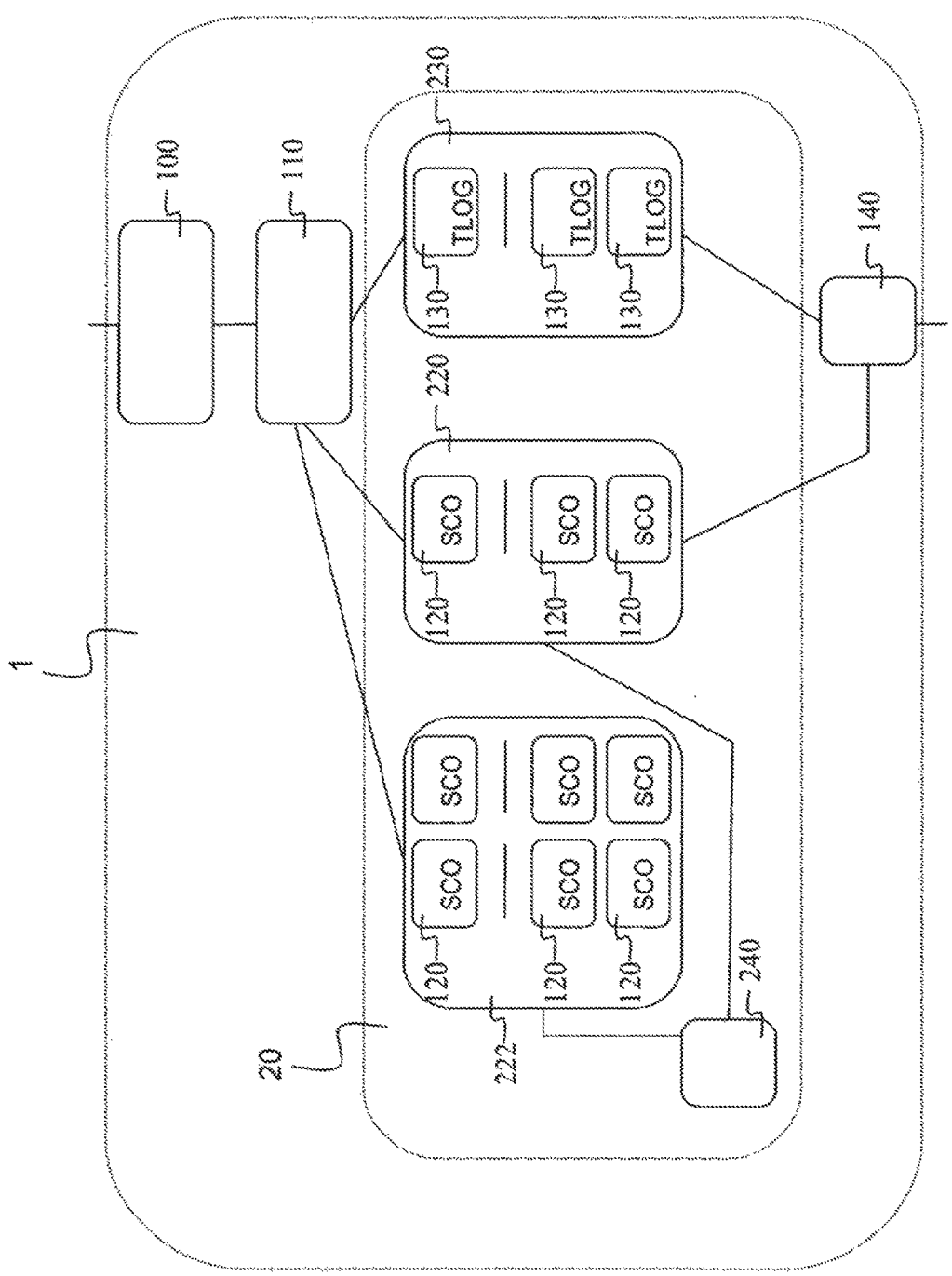

According to a further embodiment as shown in FIG. 5, there can optionally be provided a transaction log cache 230. This means that whenever read operation is requested for a cluster at LBA x through the block device interface 100, the volume interface 110 needs to identify in which SCO and at with offset d that cluster was stored. In the embodiment according to FIG. 2 it was described how this SCO and offset can be found by scanning through the TLOG objects in reverse order. To make the scanning through these TLOG's faster, TLOG objects can also be cached locally in the local object cache 20. This is called the transaction log cache 230. The most frequently created TLOG's are retained in the transaction log cache 230, such that the most recently written entries can be found in the local object cache 20, and thus faster.

Figure 6:
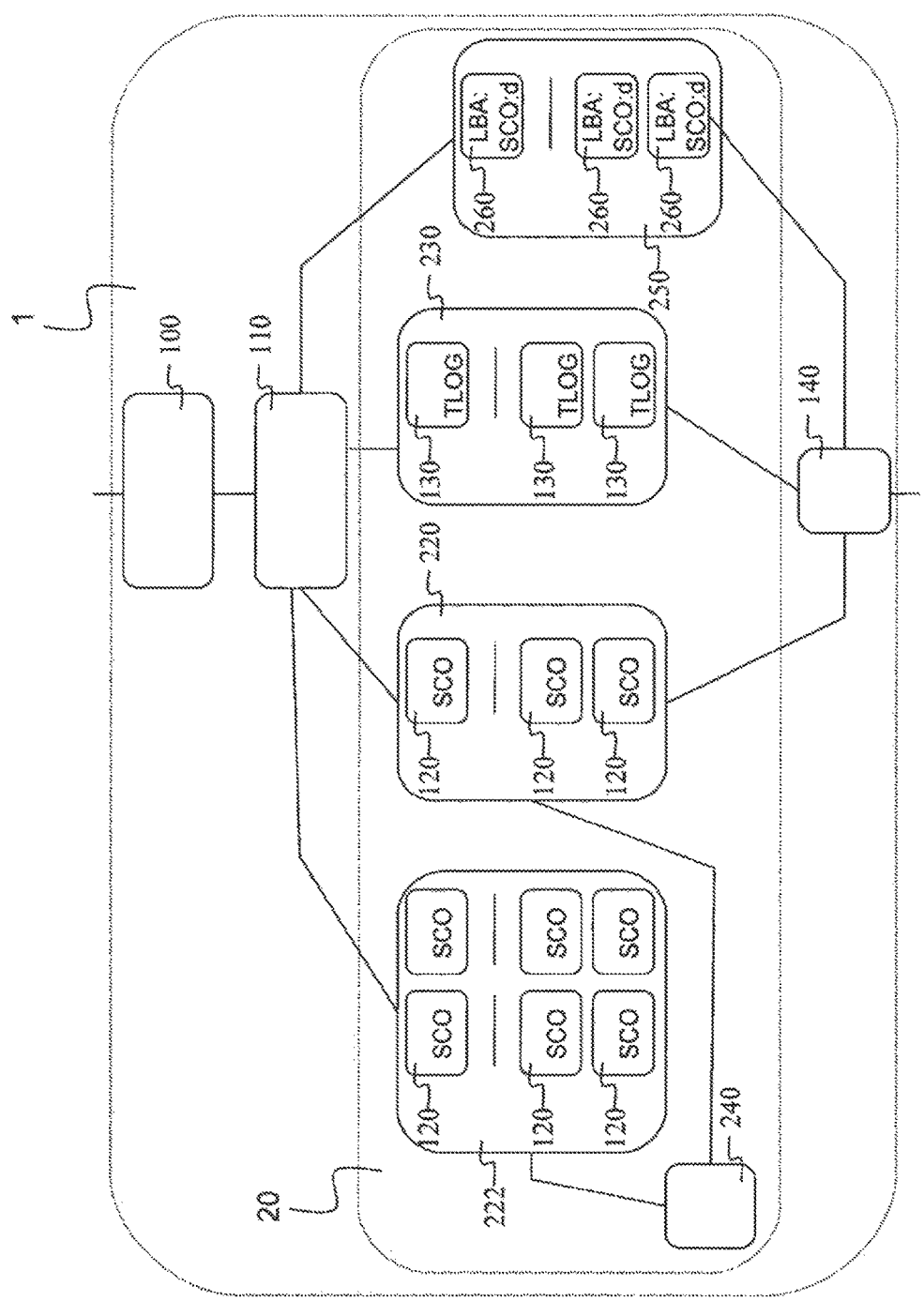

FIG. 6 shows still a further embodiment according to the invention further comprising an optional meta data cache 250. Even with the transaction log cache 230 described previously, entries for clusters that were written relatively long time in the past, but are read frequently always need to be retrieved from TLOG's in the object storage system 50. The transaction log cache 230 does not help in speeding that up.

To respond to these read requests faster, an optional meta data cache 250 can be implemented locally. The meta data cache 250 is a sparse memory map that comprises entries 260 that map every written cluster LBA address to its corresponding SCO and offset d. By maintaining the meta data cache 250, the meta data of every cluster can be retrieved locally and quickly, without having to read data from the object storage system 50.

The role of the meta data cache 250 is to map a cluster at a predetermined LBA to an associated SCO and an offset d within that SCO. The Meta data cache is thus related to the current state of the block device interface 100. It does not provide historical information. The meta data cache 250 can be implemented as a high performance lookup cache. The meta data cache 250 is not persisted to the object storage system 50 as it can always be reconstructed from the TLOG's, if this would be needed after a crash or reboot of a volume.

The role of the TLOG's 130 is to maintain a chronological log of all write operations in a volume. It provides a mechanism to roll back a volume to a previous state, restart or clone a volume as it was any time in the past or remove overwritten cluster data. Since a block device interface 100 only has write (update) operations and no delete operations, one needs a mechanism to be able to identify what blocks have been overwritten. The transaction log comprises a list of entries comprising an LBA, an associated SCO and offset d, written in a chronological fashion. One can identify what block is overwritten by another block by parsing this transaction log.

For the embodiment shown in FIG. 6 a write operation issued through the block device interface 100 is performed as described below. When a cluster write operation is issued through the block device interface 100, for writing a cluster at a predetermined LBA x comprising data sized 4 Kbytes, following actions will happen:

1. The cluster is written into a Storage Container Object (SCO) 120 in the Tier 1 data cache 220. The SCO 120 is an object that is a coalescence of clusters that have been written to the block device interface 100, arranged in order of time of writing. The first cluster will create the SCO, the second cluster written will be appended to the SCO, etc. Once an SCO exceeds a defined size, the SCO is closed for writing and a new SCO object will be created as soon as a new write operation arrives. An SCO is identified by an SCO-name.

2. The transaction log 130 is updated with an entry comprising the LBA x, the associated SCO-name and the offset d within that SCO. The offset d is a number that identifies how many bytes from the beginning of the SCO the cluster associated with LBA x is written.

3. The meta data cache 250 is updated with the LBA x, the associated SCO-name and the offset d within that SCO.

For the embodiment shown in FIG. 6 a read operation issued through the block device interface 100 is performed as described below. When a cluster read operation is issued through the block device interface 100, for reading a cluster at a predetermined LBA y comprising data sized 4 Kbytes, following actions will happen:

1. A lookup operation will happen inside the meta data cache 250 to identify the SCO-name z of the SCO where the actual cluster associated with LBA y is residing and what its offset d is inside that SCO.

2. The volume driver 110 identifies whether the SCO z resides in the data cache 220, 222. If the SCO is not in the data cache 220, 222, it is first loaded by the object reader/writer 140 from the object storage system 50 into the data cache 220, 222.

3. The SCO with SCO-name z is opened and a read operation will be executed starting at offset d and will retrieve the 4 Kb cluster data and provide it to the application 40 interacting with the block device interface 100.

According to still a further embodiment it is optionally possible to run multiple block device interfaces 100. Multiple block device interfaces 100 can run in parallel on the volume interface 110. In that case, a meta data cache 250 and a transaction log 130 is created per block device interface 100.

The data cache 220, 222 is managed across all block device interfaces 100. Thus SCO's 120 that are most frequently accessed across all block device interfaces 100 will remain in the Tier 1 data cache 220, while SCO's 120 that are accessed infrequently across all block device interfaces 100 are moved to Tier 2 data cache 222 and eventually removed from the data cache 220, 222. By managing the data cache 220, 222 across volumes, the volume driver 110 avoids reserving cache space for idle volumes.

The embodiments according to the invention allow for advantageous snapshot operations. A snapshot is a point in time copy of a block device. One will make a snapshot to freeze the state of that block device. A snapshot can be a known state to roll back a block device to if it would get corrupted. A snapshot can also serve as a restore point to access data which is already removed in the current block device. Finally, a snapshot can be used to create a clone of the block device as it was at the point of the snapshot.

Conventional implementations of block device snapshots involve copy operations.

Copy on write snapshot implementations copy away a block to another location when it is overwritten after a snapshot. The disadvantage of this method is that block writes are slowed down by the copy operation for underlying snapshots. The number of snapshots on a given volume will be limited because of that.

Split mirror snapshot implementations copy all block writes to 2 block devices up till the point a snapshot is taken. At that point, the mirror is broken and the state of one of these volumes at the time of the snapshot is maintained. This implementation requires all data to be stored for each snapshot, which requires a multitude of capacity to support snapshots. The mirroring operation also slows down the write performance of the system.

The current invention allows for a very efficient method for making snapshot. Making a snapshot on the block device interface 100 has no impact on the performance of the block device interface 100. Making a snapshot does not involve any data copy operations which limits the amount of disk capacity required to retain snapshots, and it avoids disk IO operations and bandwidth consumption that are associated with copy operations.

When a user requests a snapshot on the volume interface 110 for a given block device interface 110, the following actions are triggered:

1. The SCO 120 which is currently being filled for the block device interface 100 is closed, and a new SCO is created to store subsequent block writes. The closed SCO is queued for writing to the object storage system 50.

2. The TLOG 130 that is currently being filled is closed and queued for writing to the object storage system 50.

3. A meta data file is written to the object storage system 50 to reference this TLOG as the endpoint for this snapshot.

As one can see, these operations are no different than the operations during a normal write operation. Therefore, snapshots do not cause a performance drop on the block device interface 100. And snapshots do not initiate data copy operations.

The embodiments according to the invention also allow for an advantageous implementation of cloning operations. Clones are fully functional read/write block devices that are an identical copy of a snapshot state of a volume.

The current invention offers a unique method to create a fully functional read/write clone of a block device without copying any data. When a snapshot of a block device interface 100 is cloned the following actions are performed:

1. A new clone block device interface 100 is created on the volume interface 110.

2. An empty transaction log 130 is created for that volume 100.

3. The TLOGs associated with the parent volume, starting from the creation of the parent volume, up to the TLOG of the snapshot where the clone is created from, are read from the object storage system 50.

4. These TLOGs are replayed to create the meta data cache 250 for the clone block device interface 100.

Now the clone block device interface 100 is ready for use. As its meta data cache 250 refers to the same SCOs 120 as the parent volume 100, no data was copied at this point. As soon as clusters are being written to the clone block device interface 100, these are added to SCOs which are created specifically for the cloned block device interface 100, while the meta data is added to a TLOG which is specific to this clone block device interface 100.

Figure 7:
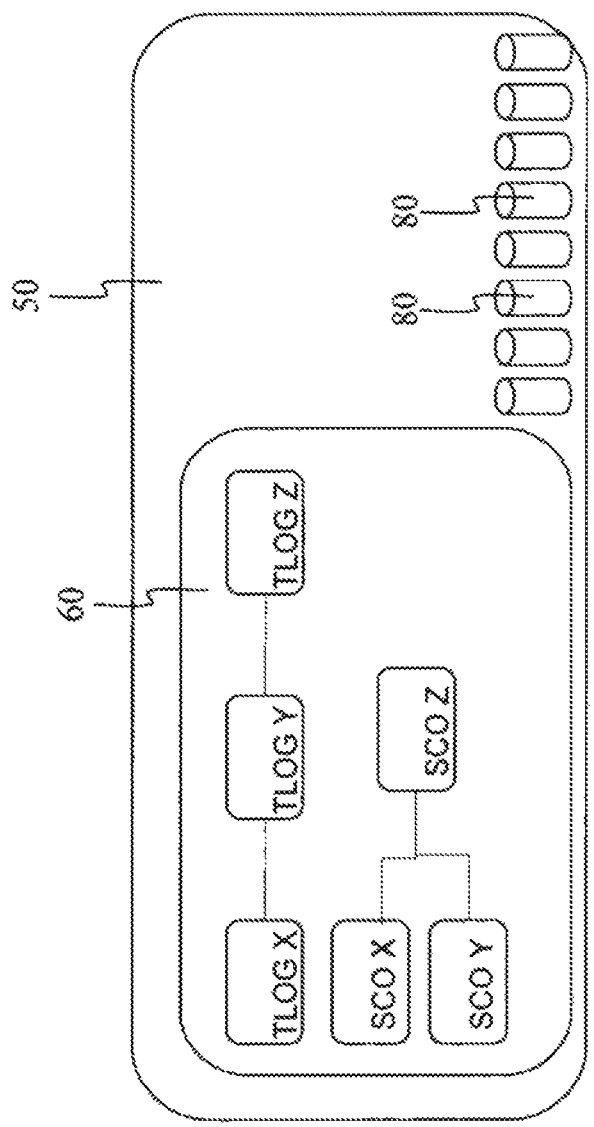

According to an embodiment of the invention as shown in FIG. 7 additionally scrubbing can be provided. The described device driver 1 is a write optimized implementation, where every block is written to the object storage system 50. As the object storage system 50 is not infinite in size, it will be necessary to remove obsolete data from the object storage system 50. This process is called scrubbing.

Consider the following sequence of events:

The block device interface 100 receives a write command for a cluster at LBA x, its data is appended to SCO y.

SCO y is written to the object storage system 50 once it is closed.

Later in time, the block device interface 100 receives a new write command to write a cluster at LBA x, its data is appended to the then current SCO z.

SCO z is written to the object storage system 50 once it is closed.

Now the cluster associated with LBA x in SCO y is not needed anymore and can be deleted. The process of deleting this obsolete data is called scrubbing.

Scrubbing needs to consider snapshots as well. Consider the following sequence of events:

A write command is received by the block device interface 100, also known as the volume, to write a cluster at LBA x, its cluster data is appended to SCO y.

SCO y is written to the object storage system 50 once it is closed.

A snapshot is created for the volume 100.

Later in time, a new write command is received by the block device interface 100 to write a cluster at LBA x, its data is appended to the then current SCO z.

SCO z is written to the object storage system 50 once it is closed.

Now the cluster in SCO y needs to be retained as it is required to represent the volume state at the point of the snapshot. Therefore scrubbing cannot cross snapshot boundaries.

Scrubbing can be integrated in the volume interface 110. Or optionally, it can be implemented as an efficient method for scrubbing data in an object storage system 50 with minimal impact on the volume interface 110 operations. In an efficient implementation, the scrubbing agent 60 runs in parallel to the volume interface 110. It can potentially run on a separate machine to avoid impacting the performance of the volume interface 110.

The scrubbing agent 60 operates between the time of the creation of the block device interface 100, also known as a volume, and the first snapshot, or between two subsequent snapshot points. Multiple scrubbing agents can operate in parallel, as long as they each operate between different snapshot points.

A scrubbing agent 60 that is started to run between snapshot x and snapshot x−1, or between snapshot 1 and the creation time of the volume will perform the following actions:

Retrieve all TLOGs from the object storage system 50 that were created and stored between the predetermined snapshot points.

Concatenate all TLOGs to create one new large TLOG x that is sorted in time.

Perform a meta data scrub on the TLOG x:

Read all entries from TLOG x, the oldest first and verify the LBA for the entry.

If no entry for the LBA exists in the list add the current entry to the top of a linked list.

If an entry for the LBA already exists in the list, add the current entry to the top of a linked list and remove the previous entry form the list.

Write the list in time order to a new TLOG y.

After this meta data scrub, TLOG y only contains relevant entries for snapshot x. All entries that were overwritten have been removed from the TLOG. The next phase of the scrub is a data scrub on the referenced SCO's. This could be a basic scrub or optionally more optimized scrubbing methods:

Basic scrub:

Removes SCO's for which all cluster entries have been obsoleted. Such SCO's are simply removed from the object store to free up space.

Optimized scrub that collapses SCO's of which over 50% of the cluster entries have been obsoleted. Following actions are taken:

Read all entries from SCO x and SCO y, and write entries that were not obsoleted to new SCO z.

Create a relocation log that keeps track of all entries that have been relocated to new SCO's.

Create a new TLOG z with references to the new SCO's and offsets.

All volumes that rely on these SCO x and SCO y need to be made aware of the relocations. The concerned volumes are the parent volume and eventual clone volumes.

Apply the relocation log on the volume meta data cache 250.

After this step all volumes are using the new SCO z.

Delete old SCO x and SCO y from the object storage system 50.

Optimized scrub with access frequency optimization. The volume interface 110 is write optimized. Clusters are written in sequence in an SCO object. It might well be that the read pattern for these clusters is different. E.g. one could analyze read patterns and find that a sequence for reading clusters is fundamentally different than the initial write sequence. If this is the case, the read pattern can be considered during a scrub cycle. As clusters are copied to a new SCO z by the scrubbing agent, the clusters will be added to the SCO z in the expected read order. This will speed up future reads of these clusters for this volume.

Figure 8:
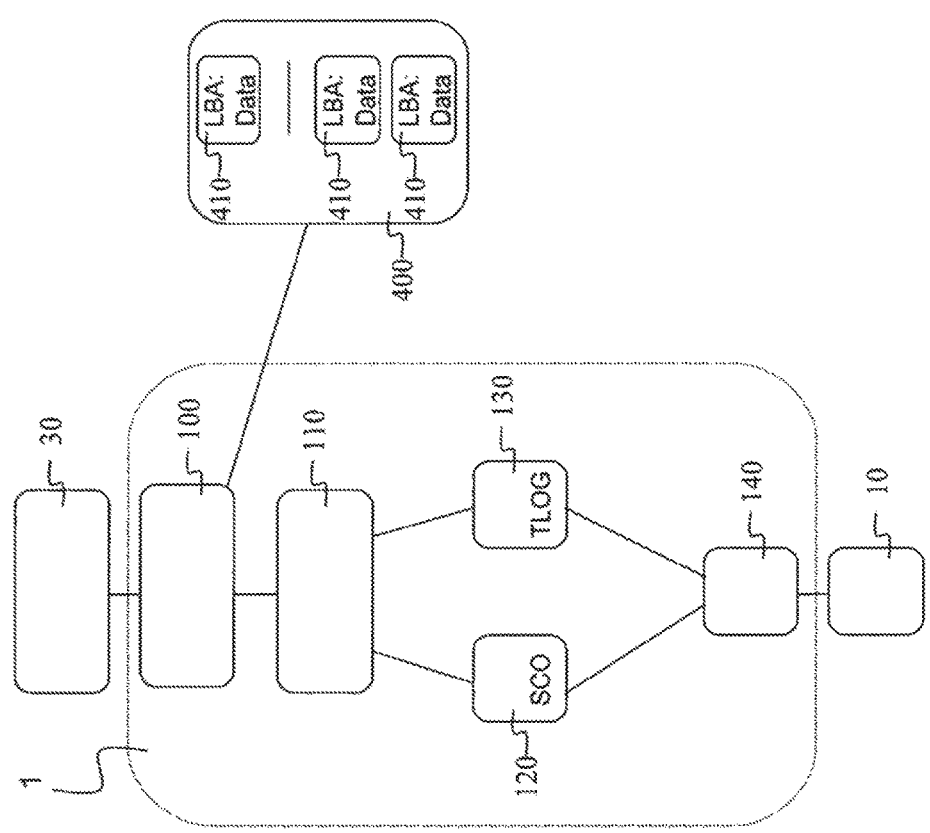

According to still a further embodiment of the invention as shown in FIG. 8 there can optionally be provided a failover cache 400.

The cache in the volume interface 110 that stores the SCO and TLOG that is currently being filled until it reaches a predetermined size could potentially be a single point of failure. Data that is not written in the object storage system 50 could be lost when the system where the volume interface 110 is running fails unexpectedly. The current invention provides a method to protect against such failures. Associated with a volume interface 110, a failover cache 400 is installed on a remote system. When a cluster is written to a given LBA x via the block device interface 100 to the volume interface 110, the following actions are taken:

The volume interface 110 transmits the cluster with its LBA address to the failover cache 400.

The failover cache 400 stores the cluster data with the LBA address in an entry 410 in a sequential data log.

The volume interface 110 stores the cluster locally in its cache in an SCO and TLOG that is being filled as described before.

Purging the failover cache 400 can be performed when a TLOG is written to the object storage system 50, including all the associated SCOs, as then that data is stored safely. At that point, a message is sent to the failover cache 400 to delete all entries which are part of these SCOs. Thus at any time, only the data referenced by the TLOG currently being filled by the volume interface 110 of a block device interface 100 is retained in the failover cache 400.

The failover cache 400 can be used for restarting a volume 100 after a crash. The volume interface 110 will then perform following actions when restarting a volume after a crash. We assume the cache to be empty in this case:

A new clone block device interface 100 is created on the volume interface 110.

An empty transaction log 130 is created for that block device interface 100.

the TLOGs of the parent volume starting from the creation of the volume, up to the last TLOG that was saved are read from the object storage system 50.

These TLOGs are replayed to create the meta data cache 250 for the clone block device interface.

The volume interface 110 then reads all entries in the failover cache as if they would originate from the block device interface 100.

The data of the entries is saved to a new SCO, while the meta data is added to the TLOG.

Once all entries from the failover cache 400 have been replayed, the clone block device interface can be used for I/O operations.

This scenario guarantees that no data is lost at any time.

According to an alternative embodiment of the invention the functionality of the device driver 1 as described above can be implemented as an application programming interface (API) or a software application module that can interact directly with the application 40.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

What is claimed is:

1. A system comprising:
   a processor; and
   a device driver, stored on a memory and executable by the processor, adapted to transfer data between a file system and an object storage system, the data being in the form of data blocks, having a fixed length, in the file system and in the form of data objects in the object storage system, the data objects being greater in size than the data blocks, the device driver comprising:
   a block device interface, stored on the memory and executable by the processor, configured to receive the data blocks from the file system;
   an aggregator, stored on the memory and executable by the processor, configured to aggregate the received data blocks into a container object sized for storage in the object storage system, wherein the container object is associated with a first unique identifier; and
   a logger, stored on the memory and executable by the processor, configured to maintain a transaction log which includes, for a data block of the received data blocks, the first unique identifier associated with the container object into which the data block is aggregated and an offset identifying a location of the data block in the container object, wherein the transaction log is associated with a second unique identifier and stored separately from the container object in the object storage system.

2. The system according to claim 1, wherein the aggregator comprises:
a container object generator, stored on the memory and executable by the processor, configured to generate the container object;
a cluster writer, stored on the memory and executable by the processor, configured to:
append successive clusters of the received data blocks to the container object; and
close the container object; and
an object reader/writer, stored on the memory and executable by the processor, configured to read/write the container object from/to the object storage system.

3. The system according to claim 2, wherein the cluster writer is configured to close the container object in response to:
the container object reaching a predetermined maximum size;
a predetermined time period elapsing;
receiving a snapshot command; or
receiving a sync command.

4. The system according to claim 1, wherein the logger comprises:
a transaction log generator, stored on the memory and executable by the processor, configured to generate the transaction log;
an updater, stored on the memory and executable by the processor, configured to update the transaction log responsive to a data block being aggregated into the container object;
a transaction log closer, stored on the memory and executable by the processor, configured to close the transaction log; and
a transaction log writer, stored on the memory and executable by the processor, configured to write the transaction log to the object storage system separately from the container object.

5. The system according to claim 4, wherein the transaction log closer is configured to close the transaction log in response to:
the transaction log reaching a predetermined maximum size;
a predetermined time period elapsing;
receiving a snapshot command; or
receiving a sync command.

6. The system according to claim 1, further comprising:
a container object cache configured to cache the container object;
a transaction log cache configured to cache the transaction log separately from the container object; and
a metadata cache.

7. The system according to claim 6, wherein the device driver further comprises:
a metadata cache generator, stored on the memory and executable by the processor; and
an updating arrangement, stored on the memory and executable by the processor, configured to update the metadata cache each time a new data block is aggregated into the container object.

8. The system according to claim 6, wherein the container object cache comprises a plurality of tiers of cache memories, including a first tier with low capacity and fast access speed, and one or more successive tiers having higher capacity and lower access speeds than the first tier.

9. The system according to claim 1, wherein the device driver further comprises:

a plurality of block device interfaces, stored on the memory and executable by the processor;
a single container object cache, comprising a plurality of tiers of cache memories configured to cache data blocks received from the plurality of block device interfaces;
a plurality of transaction log caches, each corresponding to a separate block device interface of the plurality of block device interfaces; and
a plurality of metadata caches, each corresponding to a separate block device interface of the plurality of block device interfaces.

10. The system according to claim 1, further comprising:
a snapshot generator, stored on the memory and executable by the processor, configured to generate a snapshot of the container object, the snapshot generator comprising:
a container object closer, stored on the memory and executable by the processor, configured to close an open container object;
a container object writer, stored on the memory and executable by the processor, configured to write the closed container object to the object storage system;
a transaction log closer, stored on the memory and executable by the processor, configured to close an open transaction log;
a transaction log writer, stored on the memory and executable by the processor, configured to write the closed transaction log to the object storage system separately from the closed container object; and
a metadata writer, stored on the memory and executable by the processor, configured to write metadata to the object storage system referencing the closed transaction log as an endpoint of the snapshot.

11. The system according to claim 1, further comprising:
a clone generator, stored on the memory and executable by the processor, the clone generator comprising:
a clone block device interface generator, stored on the memory and executable by the processor, configured to generate a clone block device interface;
a transaction log generator, stored on the memory and executable by the processor, configured to generate a transaction log for the clone block device interface;
a reader, stored on the memory and executable by the processor, configured to read, from the object storage system, transaction logs up to a given snapshot; and
a transaction log replayer, stored on the memory and executable by the processor, configured to replay the transaction logs to generate a metadata cache for the clone block device interface.

12. The system according to claim 1, further comprising a scrubber, stored on the memory and executable by the processor, configured to remove obsolete data, stored between successive snapshot events, from the object storage system.

13. The system according to claim 12, wherein the scrubber comprises:
a container object remover, stored on the memory and executable by the processor, configured to remove the container object from the object storage system in response to all data blocks in the container object becoming obsolete between the successive snapshot events.

14. The system according to claim 12, wherein the scrubber comprises:
a container object collapser, stored on the memory and executable by the processor, configured to collapse the container object in response to a threshold number of data blocks in the container object becoming obsolete between the successive snapshot events; and a new container object generator, stored on the memory and executable by the processor, configured to generate a new container object into which non-obsolete data blocks are aggregated.

15. The system according to claim 14, wherein the scrubber further comprises:

an analyzer, stored on the memory and executable by the processor, configured to analyze read patterns; and a data block organizer, stored on the memory and executable by the processor, configured to organize data blocks in the new container object based on expected read order.

16. The system according to claim 1, further comprising:

a failover cache configured to cache the data block before aggregating the data block into the container object and before updating the transaction log with information about the data block.

17. The system according to claim 1, wherein the object storage system is a cloud storage system.

18. The system according to claim 1, wherein the aggregator is further configured to aggregate a sequence of data blocks into a cloud storage container object.

19. The system according to claim 1, wherein the transaction log comprises an entry for each received data block aggregated into a plurality of container objects, the entry for each received data block being stored in the transaction log in a chronological fashion.

20. The system according to claim 1, wherein the aggregator is further configured to:

open a new container object responsive to transferring the container object to the object storage system; and aggregate subsequently received data blocks into the new container object while the transaction log continues to be updated.

* * * * *